United States Patent [19]

Arutaki et al.

[11] Patent Number: 4,835,766
[45] Date of Patent: May 30, 1989

[54] MONITORING SYSTEM CAPABLE OF MONITORING A SEQUENCE OF DIGITAL SIGNALS FLOWING THROUGH A SUBSCRIBER LINE

[75] Inventors: Akira Arutaki; Hiromi Takahashi, both of Tokyo, Japan

[73] Assignee: NEC Corporation, Tokyo, Japan

[21] Appl. No.: 51,355

[22] Filed: May 19, 1987

[30] Foreign Application Priority Data

May 20, 1986 [JP] Japan ............................... 61-113807

[51] Int. Cl.$^4$ .......................................... H04Q 11/04
[52] U.S. Cl. ..................................... 370/58; 370/13.1; 370/66
[58] Field of Search .................... 370/13.1, 13, 14, 58, 370/60, 64, 66

[56] References Cited

U.S. PATENT DOCUMENTS

| | | | |
|---|---|---|---|
| 4,185,172 | 1/1980 | Melindo et al. | 370/13 |
| 4,207,433 | 6/1980 | Burtholomay et al. | 370/13 |
| 4,266,292 | 5/1981 | Regan et al. | 370/13 |
| 4,447,679 | 5/1984 | Kojima et al. | 370/13 |
| 4,493,073 | 1/1985 | Witmore et al. | 370/13 |
| 4,575,839 | 3/1986 | Ogata et al. | 370/13 |
| 4,611,320 | 9/1986 | Southard | 370/13 |
| 4,653,043 | 3/1987 | Brady et al. | 370/13 |
| 4,695,997 | 9/1987 | Montanari et al. | 370/13 |

Primary Examiner—M. H. Paschall
Attorney, Agent, or Firm—Foley & Lardner, Schwartz, Jeffery, Schwaab, Mack, Blumenthal & Evans

[57] ABSTRACT

For use in combination with an exchange which is coupled to a subscriber line used in transmitting a sequence of digital signals and comprises a time division switch unit coupled to the subscriber line and a control unit for controlling the time division switch unit to form an internal transmission path in the time division switch unit in response to the digital signals, a monitoring system comprises a command supply circuit for supplying a command to the control unit to form a monitoring path related to the internal transmission path in the time division switch unit. A coupling circuit couples to the subscriber line to a monitoring equipment through the monitoring path when the command is supplied from the command supply circuit to the control unit. The digital signal sequence is monitored by the monitoring equipment.

7 Claims, 4 Drawing Sheets

MONITORING SYSTEM CAPABLE OF MONITORING A SEQUENCE OF DIGITAL SIGNALS FLOWING THROUGH A SUBSCRIBER LINE

BACKGROUND OF THE INVENTION

This invention relates to a monitoring system for monitoring digital signals flowing through a subscriber line.

It is necessary to monitor speech signals flowing through a subscriber line connected to an exchange for supervising the subscriber line. To this end, a proposal is made about various testing systems, namely, monitoring systems. For example, a monitoring system is disclosed in U.S. Pat. No. 4,447,679 issued to Takafumi Kojima et al and assigned to Hitachi, Ltd., et al. Specifically, the monitoring system comprises an exchange, a subscriber line coupled to the exchange, and a subscriber line test equipment coupled to the exchange through a subscriber line test link. The exchange comprises a subscriber circuit connected to the subscriber line, a test network, a compensation circuit, a control unit, and a time division network. The subscriber line test link is connected to the subscriber circuit through the test network and the compensation circuit.

Analog speech signals on the subscriber line are converted to digital speech signals in the time division network. The digital speech signals are sent out of the exchange through the time division network. In the monitoring system, the analog speech signals are monitored by the subscriber line test equipment and evaluated by an operator by listening to the analog speech signals.

On bidirectional communication, digital speech signals flow in both of uwpard and downward directions through a two-wire subscriber line. The digital speech signals which flow in the upward direction from the subscriber circuit to the exchange will be called upward digital speech signals while the digital speech signals flowing in the downward direction will be called downward digital speech signals. Under the circumstances, the upward and the downward digital speech signals coexist in the test link. Consequently, the upward and the downward digital speech signals interfere in the subscriber line test equipment. It is therefore impossible to monitor digital speech signals flowing through the two-wire subscriber line.

SUMMARY OF THE INVENTION

It is an object of this invention to provide a monitoring system which is capable of monitoring bidirectional digital signals flowing through the subscriber line.

A monitoring system to which this invention is applicable is for use in combination with an exchange which is coupled to a subscriber line used in transmitting a sequence of digital signals and comprises a time division switch unit coupled to the subscriber line and a control unit for controlling the time division switch unit to form an internal transmission path in the time division switch unit in response to the digital signals. According to this invention, the monitoring system comprises a command supply unit for supplying a command to the control unit to form a monitoring path related to the internal transmission path in the time division switch unit, a monitoring unit for monitoring the digital signal sequence, and coupling means coupled to the time division switch unit and a the monitoring unit for coupling the subscriber line to the monitoring unit through the monitoring path when the command is supplied from the command supply unit to the control means.

DESCRIPTION OF THE PREFERRED EMBODIMENTS

Figure 1:
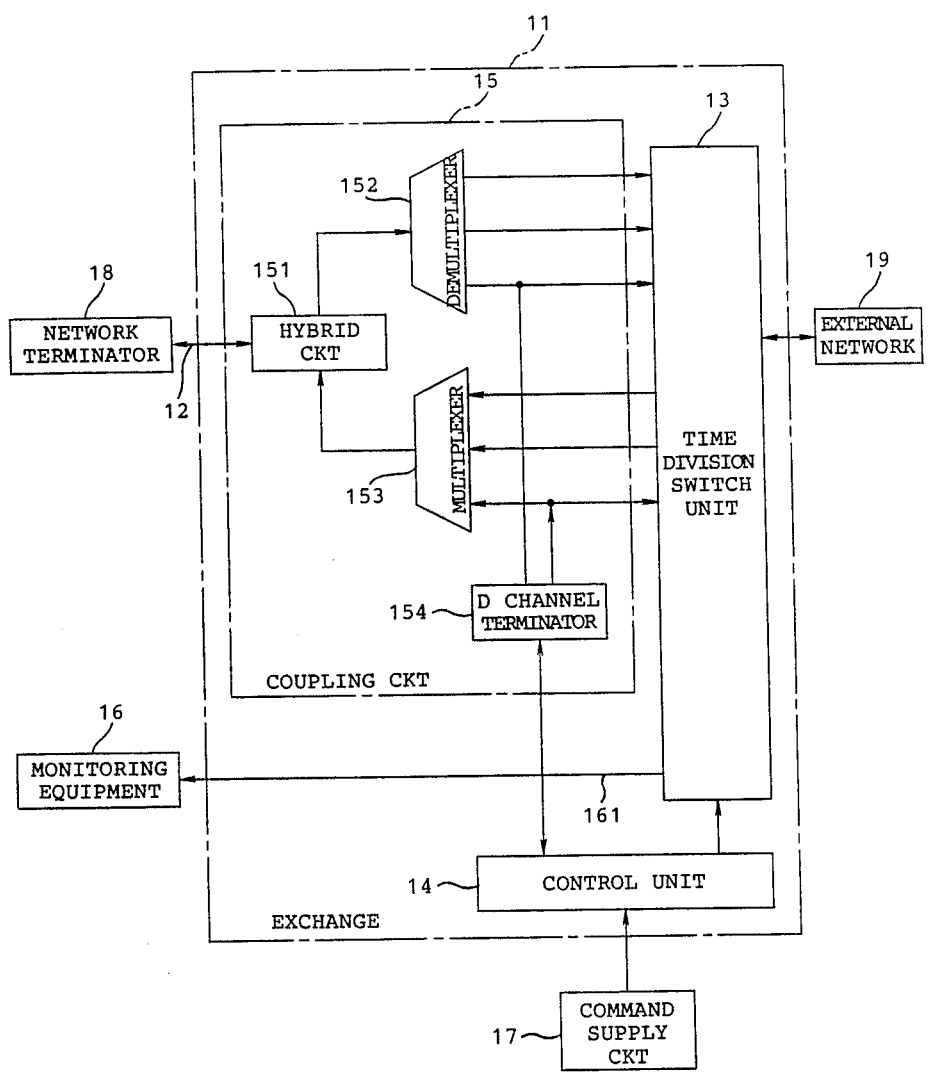
FIG. 1 shows a block diagram of a monitoring system according to a first embodiment of this invention.

Referring to FIG. 1, a monitoring system according to a first embodiment of this invention comprises an exchange 11 and a two-wire subscriber line 12 which is coupled to the exchange 11 to carry out transmission of a sequence of digital signals. The exchange 11 comprises time division switch unit 13, a control unit 14 for controlling the time division switch unit 13, and a coupling circuit 15 for coupling the subscriber line 12 to the time division switch unit 13. The coupling circuit 15 has a hybrid circuit 151 for converting two-wire to four-wire, a demultiplexer 152 and a multiplexer 153 both of which are connected to the hybrid circuit 151, and a D channel terminator 154 for protocol conversion.

A monitoring equipment 16 is connected to the time division switch unit 13 while a command supply circuit 17 is connected to the control unit 14 to supply the control unit 14 with a sequence of commands including a predetermined or specific command which will be described later. Furthermore, a network terminator 18 is connected to the subscriber line 12 on one hand and is connected to subscriber sets such as a telephone, facsimile, data terminal, etc (not shown) on the other hand.

The monitoring equipment 16 is operable to monitor digital signals which flow through the subscriber line 12 in an upward direction from the network terminator 18 to the exchange 11 and a downward direction from the exchange 11 to the network terminator 18. The digital signals which flow in the upward direction will be called upward digital signals while the digital signals which flow in the downward direction will be called downward digital signals.

The network terminator 18 is supplied with analog speech signals through the terminals and converts the analog speech signals into digital speech signals for transmission to the exchange 11. The digital speech signals are multiplexed into an upward multiplexed digital speech signal. On the other hand, the network terminator 18 is supplied from the exchanee 11 with a downward multiplexed digital speech signal through the hybrid circuit 151. In this event, the downward multiplexed digital speech signal is demultiplexed by the network terminator 18 into individual digital speech signals to be converted into individual analog speech signals which are delivered to the telephone lines.

Figure 2:
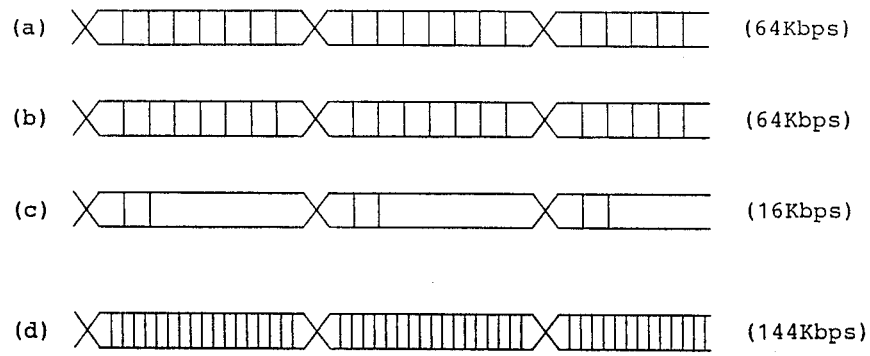
FIG. 2 shows formats of digital signals flowing through a subscriber line.

Referring to FIG. 2, each of the upward and the downward multiplexed digital signals may be of 144 Kbps and will simply be referred to as multiplexed digital signals (shown in FIG. 2(d)) when no distinction is made between the upward and the downward multiplexed digital signals. Each multiplexed digital signal is divisible into a succession of signal blocks each of which carries first digital speech signals of 64 Kbps, second digital speech signals of 64 Kbps, and digital control signals of 16 Kbps, as shown in FIGS. 2(a), (b), and (c), respectively. The digital control signals include call processing signals for controlling the control unit 14.

In FIG. 1, the multiplexed digital signal on the subscriber line 12 is determined in CCITT (The International Telegraph and Telephone Consultive Committee) Recommendation I. 430. More particularly, a pair of B channels and a single C channel are defined in the multiplexed digital signals flowing through the subscriber line 12 and are assigned to the first and the second digital speech signals and to the digital control signals, respectively.

Figure 3:
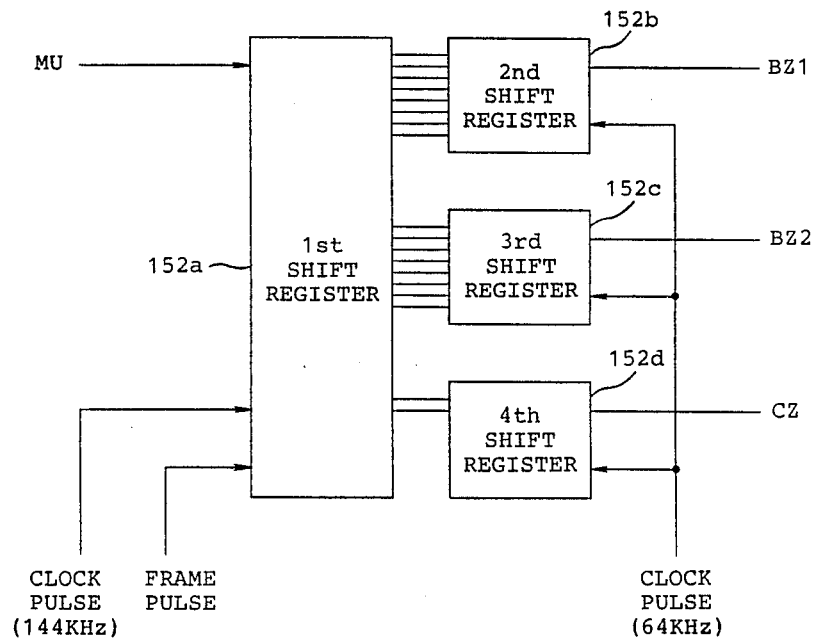
FIG. 3 shows a block diagram of a demultiplexer illustrated in FIG. 1.

Referring to FIG. 3 together with FIG. 1, the upward multiplexed digital signal, MU is sent through the subscriber line 12 and the hybrid circuit 151 and is given to the demultiplexer 152. The demultiplexer 152 has a first shift register 152a, a second shift register 152b, a third shift register 152c, and a fourth shift register 152d. The upward multiplexed digital signal MU is serially supplied to the first shift register 152a in response to clock pulses of 144 KHz and frame pulses. As a result, the first shift register 152a successively stores the first and the second digital speech signals and the digital control signals, respectively. The first and the second digital speech signals and the digital control signals of the upward multiplexed digital signal MU may be called first and second upward digital speech signals BZ1 and BZ2 and upward digital control signals CZ, respectively. The first and the second upward digital speech signals BZ1 and BZ2 are tranferred to the second and the third shift registers 152 and 152c to be sent to the time division switch unit 13 as shown in FIG. 1, respectively. Likewise, the upward digital control signals CZ are transferred to the fourth shift register 152d to be sent towards the time division switch unit 13. Each of the first and the second upward digital speech signals BZ1 and BZ2 and the upward digital control signals CZ are transmitted from the demultiplexer 152 at a transmission rate of 64 KHz.

The upward digital control signals CZ are sent to both of the time division switch unit 13 and the D channel terminator 154. The call processing signals are derived from the upward digital control signals CZ in the D channel terminator 154 to be sent to the control unit 14.

The control unit 14 controls the time division switch unit 13 to form transmission paths in the time division fashion in the time division switch unit 13 in response to the call processing signals. The first and the second upward digital speech signals BZ1 and BZ2 and the upward digital control signals CZ are delivered towards a destined subscriber through the time division switch unit 13 in a known manner. The destined subscriber may be accommodated in aother external network depicted at 19. At any rate, the first and the second upward digital speech signals BZ1 and BZ2 and the upward digital control signals CZ are multiplexed in a known manner and delivered to the external network 19 as an upward digital sequence.

On the other hand, a downward digital sequence is sent from the external network 19 to the exchange 11. Such a downward digital sequence is processed in the exchange 11 and is assumed to be delivered as first and second downward digital speech signals and downward digital control signals to the multiplexer 153. The first and second downward digital speech signals and the downward digital control signals are multiplexed by the multiplexer 153 into the downward multiplexed digital signal. The downward multiplexed digital signal is sent through the terminating set 151 and the subscriber line 12 to the network terminator 18. Such a multiplexer 153 may be similar in structure to the demultiplexer 152 illustrated in FIG. 3, if input terminals and output terminals are substituted for each other.

As a result, the upward and the downward multiplexed digital signals bidirectionally flow through the subscriber line 12.

Figure 4:
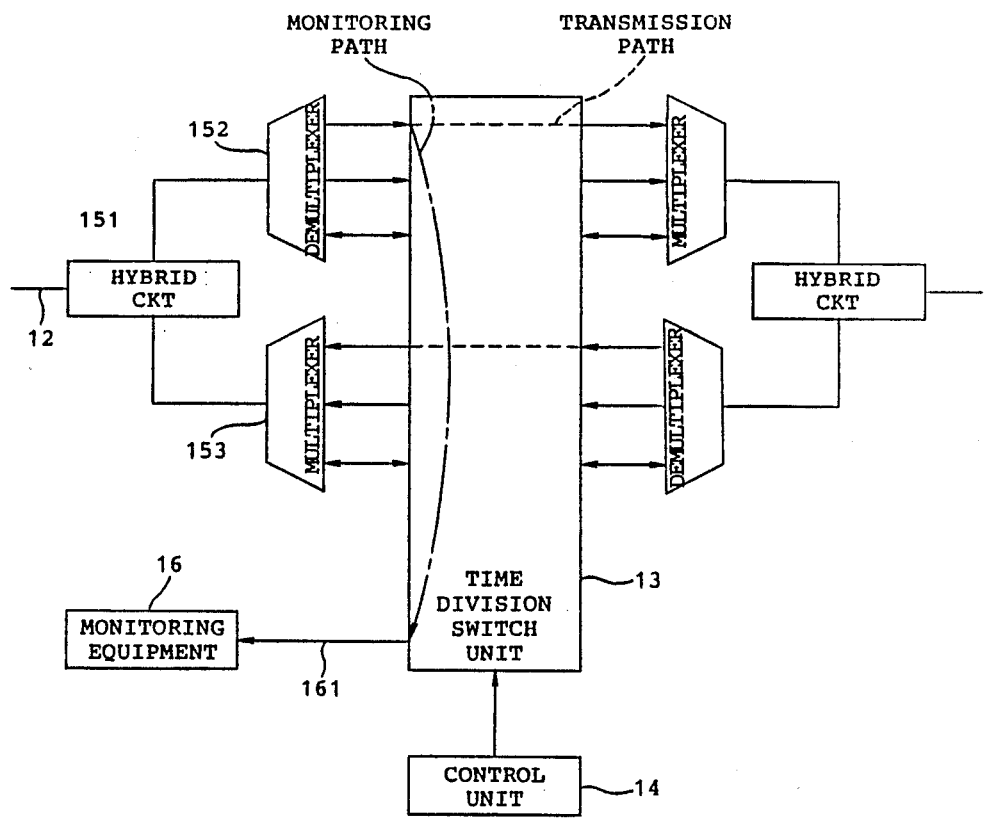
FIG. 4 shows a block diagram for use in explaining a monitoring path formed in a time division switch unit depicted in FIG. 1.

Referring to FIG. 4, the monitoring equipment 16 is for monitoring both of the upward and downward multiplexed digital signals flowing through the subscriber line. On monitoring each of the upward and the downward multiplexed digital signals, the specific command is applied to the control unit 14 from the command supply circuit 17 (FIG. 1). The control unit 14 controls the time division switch unit 13 to form a monitoring path in the time division switch unit 13 in response to the specific command.

The monitoring path is coupled to the transmission path indicated by the specific command. For example, the monitoring path is coupled to the transmission path through which the first upward digital speech signals BZ1 flow. The monitoring path is moreover coupled to the monitoring equipment 16 through a coupling line 161 which may be a line similar to the subscriber line 12. Accordingly, the first upward digital signals BZ1 are supplied to the monitoring equipment 16 through the monitoring path and the coupling line 161. The first upward digital speech signals BZ1 are converted to analog speech signals by the monitoring equipment 16. The analog speech signals are monitored by an operator through a loudspeaker or the like (not shown).

Thus, the first upward digital speech signals BZ1 are evaluated in cooperation with the specific command by the monitoring equipment 16 through the time division switch unit 13. Another command is produced from the command supply circuit 17 to evaluate the second upward digital speech signals BZ2. Likewise, the upward digital control signals CZ, the downward digital speech signals, and the downward digital control signals can be monitored by the use of the other commands determined therefor. At any rate, the monitoring equipment 16 is connected to the time division switch unit 13 and can supervise the subscriber line 12 through the time division switch unit 13 in digital and/or analog manners.

In addition, the monitoring equipment 16 may comprise a display unit for displaying each digital data signal when such digital data signals are sent through the subscriber line 12 instead of the digital speech signals. Inasmuch as the monitoring equipment 16 is used in common to a plurality of the subscriber lines, the illustrated system is simple in structure in comparison with the cnventional system disclosed by Takafumi Kojima et al.

Thus, the monitoring equipment 16 is coupled to a selected one of the channels of the subscriber line 12 through the coupling line 161 and the monitoring path.

Figure 5:
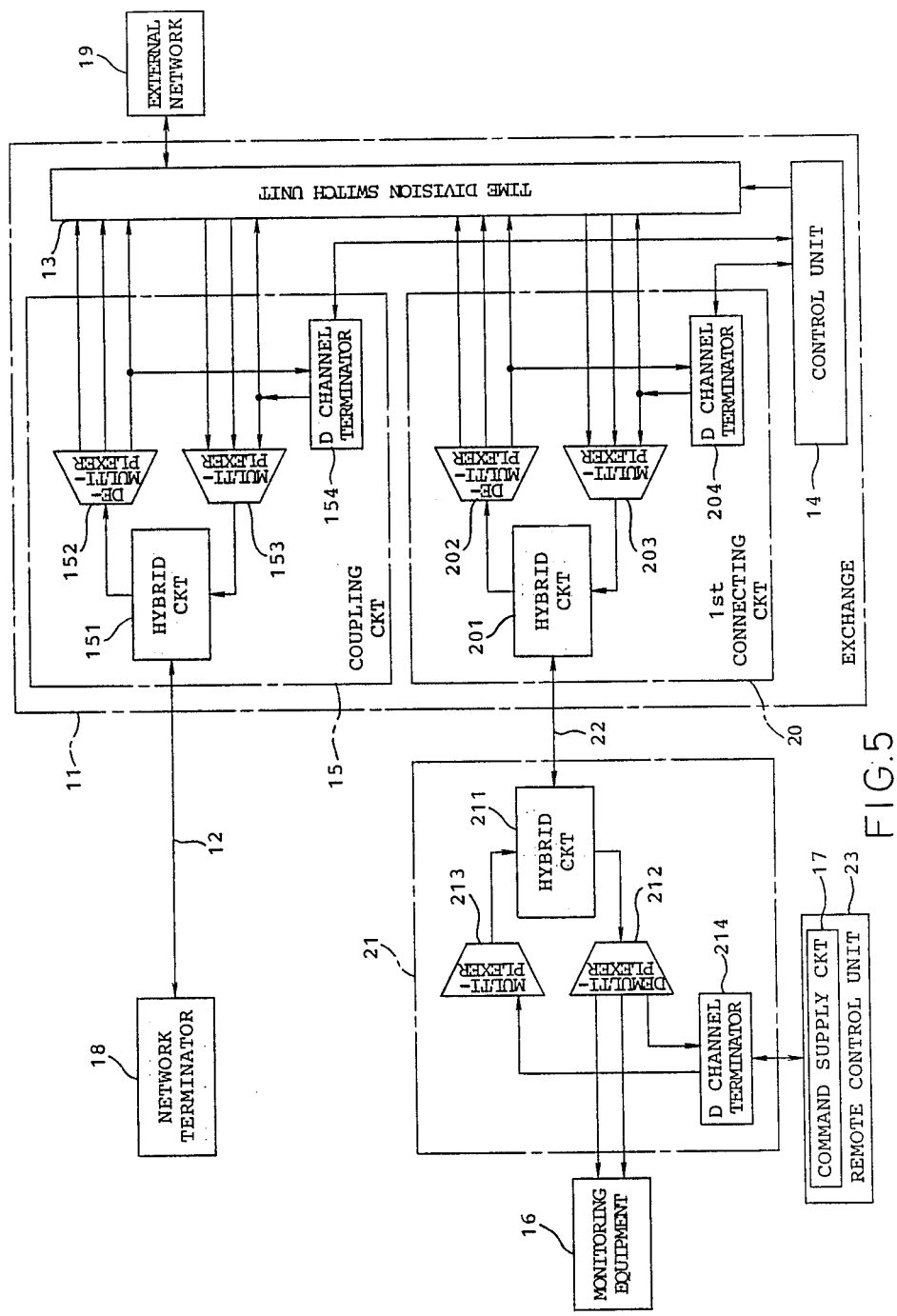
FIG. 5 shows a block diagram of a monitoring system according to a second embodiment of this invention.

Referring to FIG. 5, description will be made about a monitoring system according to a second embodiment of this invention. The illustrated monitoring system comprises similar parts designated by like reference numerals. The exchange 11 comprises a first connecting circuit 20 which is connected to the time division switch unit 13 and the control unit 14. The first connecting circuit 20 is also connected through a monitoring line 22 of two wires to a second connecting circuit 21 which is far from the exchange 11. The monitoring line 22 of two wires may be formed by a subscriber line. The monitoring equipment 16 and a remote control unit 23 are connected to the second connecting circuit 21. The remote control unit 23 comprises a command supply circuit 17 similar to that illustrated in FIG. 1.

The illustrated first connecting circuit 20 has a hybrid circuit 201 for converting two-wire to four-wire, a demultiplexer 202, a multiplexer 203, and a D channel terminator 204 for protocol conversion. Similarly, the second connecting circuit 21 has a hybrid circuit 211 for converting two-wire to four-wire, a demultiplexer 212, a multiplexer 213, and a D channel terminator 214 for protocol conversion.

On monitoring the upward multiplexed digital signal flowing through the subscriber line 12, the specific command is supplied from the command supply circuit 17 of the remote control unit 23. The specific command signals is transmitted to the multiplexer 213 through the D channel terminator 214. The specific command signal is positioned on D channel by the multiplexer 213 and is transmitted to the exchange 11 through the hybrid circuit 211 and the monitoring line 22. An upward multiplexed digital signal having the specific command signal is demultiplexed by the demultiplexer 202. The specific command signal is supplied to the control unit 14 through the D channel terminator 214.

When the control unit 14 receives the specific command signal, the control unit 14 returns an agreement signal to the remote control unit 23 through the first and the second connecting circuit 20 and 21. The control unit 14 controls the time division switch unit 13 so as to form a monitoring path for coupling the transmission path indicated by the specific command with the first connecting circuit 20.

For example, it will be assumed that the monitoring path is coupled to the transmission path through which the first upward digital speech signals BZ1 flow. The first upward digital speech signals BZ1 are positioned on B channel of a downward multiplexer digital signal by the multiplexer 203. The downward multiplexed digital signal having the first upward digital speech signals BZ1 flows through the monitoring line 22. The downward multiplexed digital signal is demultiplexed by the demultiplexer 212. The monitoring equipment 16 monitors the analog speech signals to which the first upward digital signals BZ1 are converted.

In this way, it is possible to monitor the digital signals flowing through the subscriber line 12 in a distant position from the position where the exchange 11 is located by using the remote control unit 23.

Though the description has thus far been made about monitoring two digital speech signals on the subscriber line in above embodiments, it is possible to monitor a multiplexed digital signal comprising a plurality of digital speech signals greater in number than two. Moreover, digital data signals may be monitored in lieu of the digital speech signals. In the case of monitoring the digital data signals, each digital data signal may be converted a sequence of character codes which may be displayed on a display unit of the monitoring equipment 16. In addition, the digital speech signals and/or the digtal data signals may not be multiplexed and are transmitted in both directions of each subscriber line.

What is claimed is:

1. A monitoring system for use in combination with an exchange which is coupled to a terminator through a subscriber line of two wires through which upward and downward multiplexed digital signals pass in both an upward direction from said terminator towards said exchange and a downward direction from said exchange towards said terminator, respectively, said exchange comprising:
    line converting means connected to said subscriber line for converting said two wires into four wires, two of which form an upward line and remaining two of which form a downward line;
    demultiplexer means coupled to said upward line and responsive to said upward multiplexed digital signals for demultiplexing said upward multiplexed digital signals into a plurality of upward demultiplexed digital signals;
    multiplexer means coupled to said downward line for multiplexing a plurality of downward demultiplexed digital signals into said downward multiplexed digital signals;
    a time division switch unit coupled to said demultiplexer means and said multiplexer means for forming internal paths for said upward and said downward demultiplexed signals in a time division manner; and
    control means for controlling said time division swich unit to form said internal paths in said time division switch unit;
    said monitoring system comprising:
    monitoring means for monitoring a selected one of said upward and said downward demultiplexed digital signals that is directed towards a selected one of said upward and said downward directions;
    command supply means for supplying a command to said control means in order to form a selected one of said internal paths for delivering said selected one of the upward and the downward demultiplexed digital signals to said monitoring means; and
    coupling means coupled to said time division switch unit and said monitoring means for coupling said selected one of the internal paths to said monitoring means when said command is supplied from said command supply means to said control means.

2. A monitoring system as claimed in claim 1, wherein said multiplexed digital signals comprise a first, a second, and a third digital signal which are assigned to a pair of B channels and a D channel, respectively.

3. A monitoring system as claimed in claim 1, wherein said command supply means is connected to said control means.

4. A monitoring system as claimed in claim 1, wherein:
    said coupling means comprises a first connection part connected to said time division switch unit and to said control means and a second connection part connected to said first connection part and said monitoring means;
    said command supply means being connected to said second connection part to supply said command to said control means through said first and second connection part.

5. A monitoring system as claimed in claim 4, wherein:

said command is transmitted as a command digital signal of a predetermined pattern;

said first connection part comprising first modulating means responsive to said selected one of the upward and the downward digital signals through said selected one of the internal paths for allocating said selected one of the upward and the downward digital signals to a predetermined channel to produce a monitoring multiplexed digital signal, and first demodulating means responsive to said command digital signal for demodulating said command digital signal into said command;

said second connection part being connected to said first connection part through another subscriber line and comprising second modulating means responsive to said command for allocating said command to a prescribed channel to produce said command digital signal, and second demodulating means responsive to said monitoring multiplexed digital signal for demodulating said monitoring multiplexed digital signal into said selected one of the upward and downward digital signals.

6. A monitoring means as claimed in claim 5, wherein said first connection part is included in said exchange.

7. A communication system including an exchange which is coupled to a terminator through a subscriber line of two wires through which upward and downward multiplexed digital signals pass in both an upward direction from said terminator towards said exchange and a downward direction from said exchange towards said terminator, respectively, said exchange comprising:

line converting means connected to said subscriber line for converting said two wires into four wires, two of which form an upward line and remaining two of which form a downward line;

demultiplexer means coupled to said upward line and responsive to said upward multiplexed digital signals for demultiplexing said upward multiplexed digital signals into a plurality of upward demultiplexed digital signals;

multiplexer means coupled to said downward line for multiplexing a plurality of downward demultiplexed digital signals into said downward multiplexed signals;

a time division switch unit coupled to said demultiplexer means and said multiplexer means for forming internal paths for said upward and said downward demultiplexed signals in a time division manner; and control means for controlling said time division switch unit to form said internal paths in said time division switch unit;

said communication system comprising:

monitoring means for monitoring a selected one of said upward and said downward demultiplexed digital signals that is directed towards a selected one of said upward and said downward directions;

command supply means for supplying a command to said control means to form a selected one of said internal paths for delivering said selected one of the upward and the downward demultiplexed digital signals to said monitoring means; and coupling means coupled to said time division switch unit and said monitoring means for coupling said selected one of the internal paths to said monitoring means when said command is supplied from said command supply means to said control means.

* * * * *